United States Patent [19]

Anders et al.

[11] 4,298,322

[45] Nov. 3, 1981

[54] VENTING MEANS FOR SCREW EXTRUDERS

[75] Inventors: Dietmar Anders, Hanover; Manfred Dienst, Burgdorf, both of Fed. Rep. of Germany

[73] Assignee: Hermann Berstorff Meschinenbau GmbH, Hanover, Fed. Rep. of Germany

[21] Appl. No.: 152,692

[22] Filed: May 23, 1980

[30] Foreign Application Priority Data

Jun. 2, 1979 [DE] Fed. Rep. of Germany ....... 2922572

[51] Int. Cl.$^3$ .............................................. B29F 3/03
[52] U.S. Cl. ................................... 425/147; 264/102; 264/DIG. 78; 366/75; 425/154; 425/203; 425/208; 425/DIG. 60
[58] Field of Search ............... 425/203, 208, DIG. 60, 425/147, 154; 366/75; 264/101–102, DIG. 78, 169

[56] References Cited

U.S. PATENT DOCUMENTS

| | | | |
|---|---|---|---|
| 2,959,900 | 11/1960 | Wollett | 264/DIG. 78 |
| 3,360,824 | 1/1968 | Schippers | 264/102 |
| 4,120,050 | 10/1978 | Craig et al. | 264/102 |
| 4,197,268 | 4/1980 | Anders | 264/102 |

FOREIGN PATENT DOCUMENTS 146897 8/1936 Austria ...................... 264/102

*Primary Examiner*—Jeffery R. Thurlow
*Attorney, Agent, or Firm*—Schwartz, Jeffery, Schwaab, Mack, Blumenthal & Koch

[57] ABSTRACT

In venting means for a screw extruder, particularly for thermo-plastics material, which venting means comprises a substantially vertical venting shaft communicating with the bore of a cylinder of the extruder and coupled to a low pressure source by a pipe, a pivotable flap which is moved from its normal position shown, when acted upon by plastics melt being extruded and rising in the shaft due to malfunction of the extruder, to cover the end of the pipe and prevent the melt passing into the pipe.

5 Claims, 1 Drawing Figure

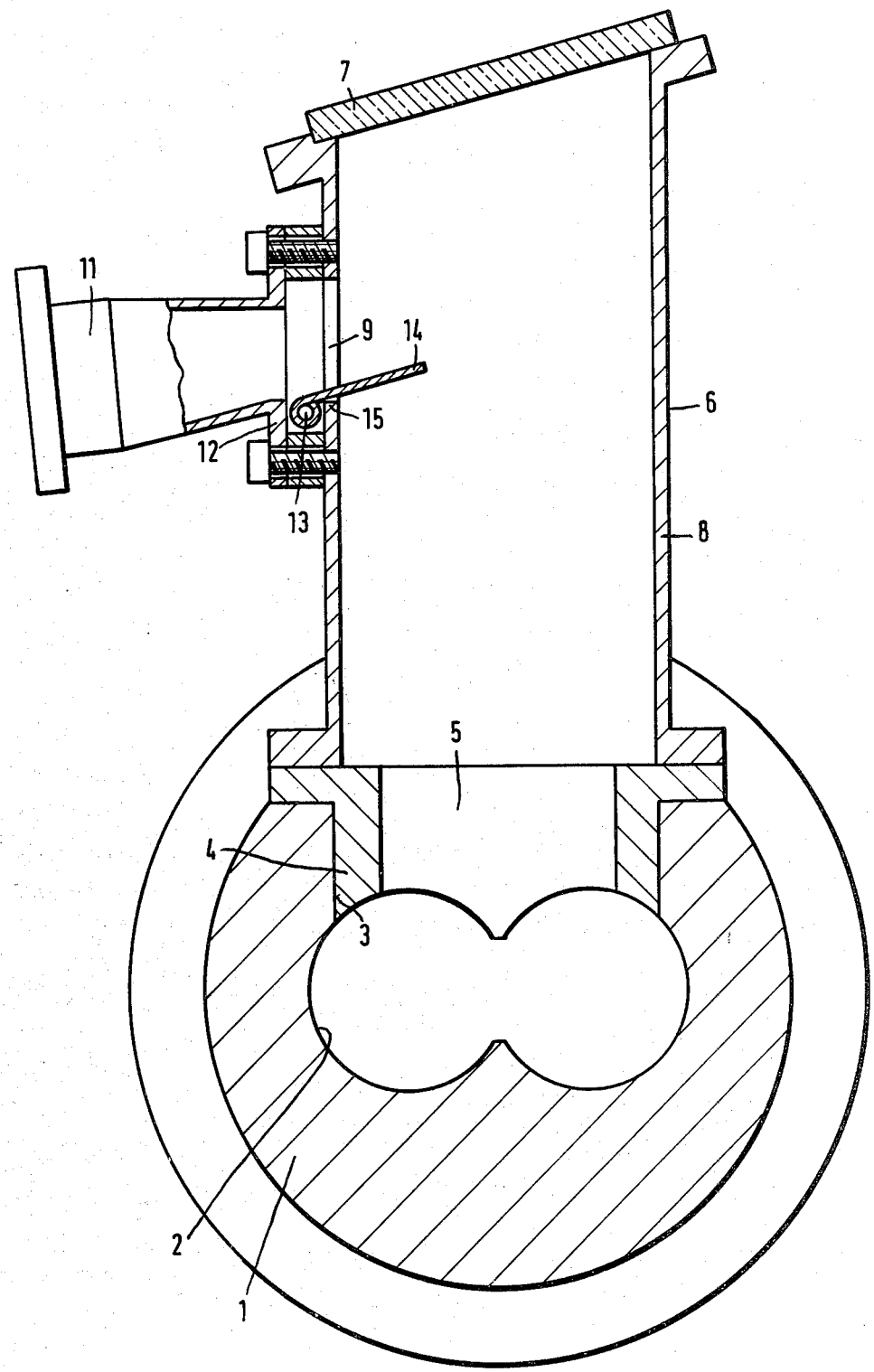

VENTING MEANS FOR SCREW EXTRUDERS

The invention relates to venting means for screw extruders particularly though out exclusively for processing thermo-plastics materials. It has been previously porposed in extruders to provide venting means in the cylinder of the screw extruder between a feed aperture thereof and an extrusion orifice thereof. Such means usually include a venting shaft communicating a venting aperture in the cylinder with a source of low pressure. The problem arises that, if conveying of the material is disturbed or fluctuates, for example due to blockage of the extrusion orifice, the melt can rise in the venting shaft and can enter the connecting pipe leading to the low pressure source. This necessitates an expensive cleaning operation. The connecting pipe usually also contains a condenser for volatile constituents of the melt which are being vented. Cleaning the condenser of thermo-plastic material is particularly time consuming.

A number of technical proposals have been made aiming to prevent the connecting pipe leading to the low pressure source from being soiled by rising molten material. In one of these proposals the venting shaft is cylindrical and a screw is arranged rotatably within it, perpendicular to the extruder. The direction of rotation of the screw is chosen so that molten material entering the venting shaft is carried back towards the extruder cylinder. In order to prevent the plastics material from passing between the inner wall of the venting shaft containing the screw and the screw itself, the screw must have a relatively small clearance from the inner wall of the shaft. However this brings the danger of a blockage forming below the screw in the venting aperture and preventing any effective de-gassing.

A further proposal aiming to prevent the plastics material rising in the venting shaft from entering the suction pipe of the venting means is to provide parallel rollers in the venting shaft, rotating in opposite directions and towards the venting aperture. This proposal has proved to be technically extremely expensive, and the bearings of the rollers create additional sealing problems.

The invention has among its objects to provide venting means for a screw extruder wherein thermo-plastic molding material rising in the venting shaft is reliably prevented from entering the suction pipe, and wherein the said venting means are simple in construction.

According to the invention, there is provided venting means for a screw extruder comprising a cylinder containing at least one screw and having a venting aperture disposed in the screw cylinder intermediate the locations of a feed hopper and an extrusion orifice, wherein the venting aperture communicates with a substantially vertically extending venting shaft having a discharge orifice, through which discharge orifice and a pipe the venting shaft is connected to a low pressure source, and a pivotable covering flap is disposed adjacent the discharge orifice. The flap in a normal position projects into the venting shaft and is pivoted, upon rise in the venting shaft of the level of the material being extruded, to close off the connecting pipe from the venting shaft.

If plastic molding material rises in the venting shaft when the extruder is in operation, the discharge orifice in the venting shaft or the end of the connecting pipe will be closed by the covering flap, which is raised when the rising molding material presses against it. Thus the melt itself ensures that the venting means are securely scaled and it is not possible for the melt to enter the connecting pipe leading to the low pressure source.

Advantageously the pivotable covering flap is pivoted about a pivot axis which is so disposed with respect to the center of gravity of the flap that the flap is biased towards its normal position by its own weight. Thus the covering flap projects into the venting shaft when there is no melt in the upper part of the shaft, which contains the connection to the low pressure source since the flap is pivoted away from the discharge orifice by its own weight, as a result of the location of the pivot axis with respect to the center of gravity of the flap. The force acting on the flap must be slightly stronger than the suction force from the low pressure source.

If desired however there may be slight spring loading or equivalent means to make the flap assume its normal position in the venting shaft. The force which returns the flap to its normal inoperative position must be weaker than the force exerted by the rising melt.

The covering flap may be combined with a single transmitter for monitoring the filling level in the venting shaft. If the melt rises, then the motion imparted to the flap is utilized as a signal indicating filling level. This signal may be applied to an alarm device or to a dosing means, provided upstream of the feed hopper to control the amount of material fed into the extruder. The filling level signal obtained may of course be transmitted to other control means, for example, a speed control for the screw or screws of the extruder.

Providing the covering flap with a coating of a non-stick material can ensure that when the level of the melt in the venting shaft recedes, plastic molding material will not be left adhering to the flap.

The invention is diagrammatically illustrated by way of example with reference to the accompanying drawing which is a cross-sectional view through a twin screw extruder equipped with venting means according to the invention.

Referring to the drawing a twin screw cylinder 1 has a twin bore 2 for the two screws (not shown), which bore 2 extends horizontally. An insert 4 with a venting aperture 5 therein is fixed in a bore 3 in the upper part of the cylinder 1. A venting shaft 6 is bolted onto the insert 4 over the venting aperture 5 and is closed at its upper end by a transparent covering plate 7. The venting shaft 6 has a discharge orifice 9 in the side wall 8 thereof, over which discharge orifice 9 a connecting pipe 11 is flangemounted on the side wall 8. The pipe 11 is connected to a low pressure source (not shown). A spindle 13 is mounted just below the orifice 9, between an end flange 12 of the pipe 11 and the side wall 8, and has the lower end of a covering flap 14 mounted on it. The flap 14 extends into the venting shaft 6 and rests on the portion of the side wall 8 forming the lower edge 15 of the discharge orifice 9.

In normal operating conditions the volatile constituents of the molten plastics material are extracted by suction through the venting aperture 5, the shaft 6, the orifice 9 and the connecting pipe 11 to a condenser (not shown). If, during operation of the extruder, molten plastics melt rises in the shaft 6, the melt presses against the covering flap 14 projecting into the shaft 6 and pivots the flap 14 through the discharge orifice 9, to cause it to bear against the end of the connecting pipe 11 thereby closing the end of the connecting pipe. The rising melt can thus not enter the connecting pipe 11, leading to the condenser and low pressure source.

When the level of the molten plastics melt in the venting shaft 6 drops again when the fluctuation in the conveying action or other trouble which caused the rise is over, then the flap 14 pivots back into the shaft 6 under the force of gravity.

It is possible to coat the flap 14 with a layer of nonstick material, in order to prevent the melt from adhering to it when wetting plastics are being processed. Particularly good experience has been obtained with a coat of polytetrafluoroethylene.

The transparent covering plate 7 enables a rise in the filling level in the venting shaft 6 to be monitored visually. It is also possible to combine the pivotable covering flap 14 with an electrical or acoustic signal transmitter. The signal thus obtained may be used to control supply in the feed hopper of the extruder, or a means for controlling the speed of the screws of the extruder.

What is claimed is:

1. A venting assembly adapted for use with a screw extruder of the type having a cylinder, a feed hopper, a screw within said cylinder, and an extrusion orifice, said venting assembly comprising:
   (a) a venting aperture formed in said cylinder intermediate said feed hopper and said extrusion orifice;
   (b) a venting shaft extending radially outwardly from said venting aperture and being operatively connected to said cylinder so that the radially inner end of said shaft communicates with said venting aperture, said venting shaft being formed with a discharge orifice spaced from said venting aperture;
   (c) a pipe operatively connected to said shaft around said discharge orifice, said pipe communicating with a source of low pressure;
   (d) a covering flap adjacent said discharge orifice and adapted to close the same, and means for pivotally mounting said flap, the configuration and mounting of said flap being such that said flap normally projects through said discharge orifice into said venting shaft, said flap, consequent to a rise of material in said shaft sufficient to contact the underside of said flap, pivoting to cut off communication between said discharge orifice and said pipe thereby precluding material from entering said pipe.

2. The venting assembly of claim 1 wherein said flap is pivotally mounted on a spindle the axis of which is so positioned relative to the center of gravity of said flap that said flap is biased toward its normal position by its own weight, thereby permitting the venting of gas through said pipe during normal conditions of material flow.

3. The venting assembly of claim 2 wherein said spindle is mounted between an end flange of said pipe and the adjacent wall of said venting shaft, said flap engaging the adjacent surface of the end flange consequent to such rise of material in said venting shaft, thereby closing the discharge orifice.

4. The venting assembly of claim 1 further including a signal transmitter associated with said flap, the closing of said flap actuating said transmitter so as to control the flow of material being processed.

5. The venting assembly of claim 1 wherein said flap is coated with a non-stick material.

* * * * *